United States Patent [19]

Chen et al.

[11] Patent Number: 5,360,710
[45] Date of Patent: Nov. 1, 1994

[54] COLOR PHOTOGRAPHIC MATERIALS CONTAINING POLYMERIC COUPLERS

[75] Inventors: Tien-Teh Chen, Penfield; Stanley W. Cowan, Rochester; Edward Schofield, Penfield; Ping-Wah Tang, Rochester, all of N.Y.

[73] Assignee: Eastman Kodak Company, Rochester, N.Y.

[21] Appl. No.: 879,044

[22] Filed: May 6, 1992

[51] Int. Cl.$^5$ .................................. G03C 7/327
[52] U.S. Cl. ................................ 430/548; 430/546; 430/558
[58] Field of Search ................ 430/548, 546, 558

[56] References Cited

U.S. PATENT DOCUMENTS

| | | | |
|---|---|---|---|
| 2,870,012 | 1/1959 | Godowsky et al. | 430/548 |
| 3,451,820 | 6/1969 | Umberger | 430/449 |
| 3,926,436 | 12/1975 | Monbaliu et al. | 430/548 |
| 4,080,211 | 3/1978 | Van Paesschen et al. | 430/548 |
| 4,215,195 | 7/1980 | Ponticello et al. | 430/496 |
| 4,367,282 | 1/1983 | Yagihara et al. | 430/381 |
| 4,474,870 | 10/1984 | Yagihara et al. | 430/381 |
| 4,511,647 | 4/1985 | Hirano et al. | 430/381 |
| 4,518,687 | 5/1985 | Hirano et al. | 430/548 |
| 4,576,909 | 3/1986 | Goto et al. | 430/546 |
| 4,576,910 | 3/1986 | Hirano et al. | 430/548 |
| 4,576,911 | 3/1986 | Mizukura et al. | 430/548 |
| 4,612,278 | 9/1986 | Lau et al. | 430/381 |
| 4,789,626 | 12/1988 | Sakanoue et al. | 430/393 |
| 4,946,771 | 8/1990 | Maekawa et al. | 430/548 |
| 5,100,772 | 3/1992 | Chen et al. | 430/548 |
| 5,151,356 | 9/1992 | Sakanoue et al. | 430/548 |
| 5,258,278 | 11/1993 | Merkel et al. | 430/546 |

FOREIGN PATENT DOCUMENTS

| | | |
|---|---|---|
| 0321399 | 6/1989 | European Pat. Off. |
| 1-232340 | 9/1989 | Japan ............ 430/548 |

OTHER PUBLICATIONS

"Textbook of Polymer Science", Second Edition, Fred W. Billmeyer, Jr., Wiley-Interscience New York (1971), pp. 355-357.

Primary Examiner—Charles L. Bowers, Jr.
Assistant Examiner—John A. McPherson
Attorney, Agent, or Firm—Gordon M. Stewart

[57] ABSTRACT

Color photographic materials comprise a support bearing a silver halide emulsion and at least one water-dispersible polymeric coupler. The polymeric coupler is formed by polymerization of a mixture of at least one ethylenically unsaturated coupler monomer containing a dye-forming coupler moiety and at least one ionic monomer containing an ionizable functional group, in a water-miscible organic solvent. The polymeric coupler contains less than 10 weight percent of the ionic monomer.

13 Claims, No Drawings

COLOR PHOTOGRAPHIC MATERIALS CONTAINING POLYMERIC COUPLERS

FIELD OF THE INVENTION

The present invention relates to color photographic materials which include at least one water-dispersible polymeric coupler. More particularly, the invention relates to color photographic materials including a polymeric coupler formed from at least one ethylenically unsaturated coupler monomer and at least one ionic monomer. The invention also relates to methods of forming water-dispersible polymeric couplers.

BACKGROUND OF THE INVENTION

It is well known in the color photography art that color images are produced by a colored dye which is formed by a coupling reaction between an oxidized product of an aromatic primary amine color developing agent and a coupler. Various types of cyan, magenta and yellow dye-forming couplers are well known for use in such coupling reactions. For example, a coupler of the acylacetanilide or benzoylacetanilide type may be used for forming a yellow dye image, a coupler of the pyrazolone, pyrazoloazole, pyrazolobenzimidazole, cyanoacetophenone or indazolone type may be used for forming a magenta dye image, and a coupler of the phenolic or naphtholic type may be used for forming a cyan dye image.

It is also known in the art that the coupler may be in the form of a polymer which improves the ability of the dye to remain in the location where it is formed in a color photographic material. For example, the Ponticello et al U.S. Pat. No. 4,215,195, the Lau et al U.S. Pat. No. 4,612,278 and the Maekawa et al U.S. Pat. No. 4,946,771 disclose various silver halide photographic materials including polymeric couplers. The Umberger U.S. Pat. No. 3,451,820 and the Hirano et al U.S. Pat. Nos. 4,511,647 and 4,518,687 disclose further silver halide color photographic materials which employ cyan dye-forming polymer couplers formed from a mixture of ethylenically unsaturated monomers.

One difficulty encountered with the use of polymeric couplers in photographic materials is in providing good dispersions of the polymers which allow incorporation of the polymers in the photographic material. Generally, three methods have been employed in the past for dispersing polymeric couplers. In the first method, the polymeric coupler is formed by solution polymerization and is isolated by precipitation from a poor solvent. As is known in the polymer art, solution polymerization employs a solvent as the reaction medium in a homogeneous system, [Billmeyer, Jr., *Textbook of Polymer Science*, Wiley-Interscience (1971)]. The resulting solid polymer coupler is then dissolved in ethyl acetate, with or without additional coupler solvents, mixed with gelatin and surfactants, and passed through a colloid mill to produce a fine dispersion. However, this method is disadvantageous in that it requires many energy-consuming steps.

A second method for dispersing polymer couplers requires the incorporation of a large amount, usually greater than about 40 weight percent, of ionic monomers in the polymeric coupler. The resulting polymers are water-soluble and can be directly mixed with gelatin and coated with a silver halide emulsion on a support. However, this method is disadvantageous in that the use of the relatively large amount of ionic monomers increases the equivalent weight of the polymers, results in gel-polymer interactions and causes increased wandering.

A third method for dispersing polymeric couplers comprises the formation of water-dispersible polymers by emulsion polymerization or suspension polymerization as taught, for example, in the Monbaliu et al U.S. Pat. No. 3,926,436, the Van Paesschen et al U.S. Pat. No. 4,080,211, the Yagihara et al U.S. Pat. No. 4,474,870, British Reference No. 2,092,573, and European Patent Application No. 321,399. The method employing emulsion polymerization is usually preferred. However, such methods are disadvantageous in several respects. That is, owing to the low solubility of many coupler monomers in water, organic solvents are required in the emulsion polymerization. This tends to reduce the stability of the resulting polymer latexes and to reduce the percentage of solids in the polymer products. Additionally, the compositions of the polymeric couplers made by emulsion polymerization are difficult to control because of the heterogeneous nature of the system. Coupler monomers usually are solid and owing to their low water solubility, they tend to precipitate out in the aqueous phase and fail to copolymerize with other comonomers. Finally, polymeric couplers made by emulsion polymerization methods can not be isolated and redispersed in water.

Thus, a need exists for novel polymeric couplers which may be employed more easily and effectively in color photographic materials.

SUMMARY OF THE INVENTION

Accordingly, it is an object of the present invention to provide silver halide color photographic materials which include polymeric couplers. It is a further object of the invention to provide silver halide color photographic materials containing polymeric couplers which are easily dispersed for use in the color photographic materials. It is a further object of the invention to provide water-dispersible polymeric couplers for use in color photographic materials, and to provide methods for producing the water-dispersible polymeric couplers. It is another object of the invention to provide polymeric couplers which can either be dispersed directly in water or isolated as a solid which can be conveniently stored and shipped, and subsequently redispersed in water.

These and additional objects are provided by the materials and methods of the present invention. The color photographic materials of the invention comprise a support bearing a silver halide emulsion and at least one water-dispersible polymeric coupler. The polymeric couplers are prepared by polymerization of a mixture of at least one ethylenically unsaturated coupler monomer containing a dye-forming coupler moiety, and at least one ionic monomer containing an ionizable functional group, in a water-miscible organic solvent. The polymeric coupler contains less than 10 weight percent of the ionic monomer. The water-dispersible polymeric couplers employed in the present invention are directly dispersible in water. Alternatively, the polymeric couplers may be isolated as solids and easily redispersed in water at a later time. The polymeric couplers employed in the present color photographic materials are therefore advantageous in both their production and use and overcome many of the disadvantages of prior art polymeric couplers and methods.

These and additional objects and advantages will be more fully apparent in view of the following detailed description.

DETAILED DESCRIPTION

The color photographic materials according to the invention comprise a support bearing a silver halide emulsion and at least one water-dispersible polymeric coupler. The support or substrate and the silver halide emulsion are well known in the art and are used extensively in conventional color photographic materials. The water-dispersible polymeric coupler is prepared by polymerization of a mixture of at least one ethylenically unsaturated coupler monomer containing a dye-forming coupler moiety and at least one ionic monomer containing an ionizable functional group. The polymerization process is a solution polymerization conducted in a water-miscible organic solvent. The polymeric coupler contains less than 10 weight percent of the ionic monomer.

Various ethylenically unsaturated coupler monomers containing a dye-forming coupler moiety are known in the art and are suitable for use in the polymeric couplers of the present invention. The coupler moiety may be a magenta dye-forming coupler moiety, a cyan dye-forming coupler moiety or a yellow dye-forming coupler moiety. Suitable coupler monomers are described in the following references: U.S. Pat. Nos. 3,926,436, 4,201,589, 4,436,808, 4,444,870, 4,455,363, 4,455,366, 4,474,870, 4,495,272, 4,500,634, 4,511,647, 4,518,687, 4,522,916, 4,576,909, 4,576,910, 4,576,911, 4,612,278 and 4,631,251, German References Nos. 3,336,582 and 3,432,396 and European Reference No. 133,262.

Preferred ethylenically unsaturated coupler monomers which may be used in preparing the water-dispersible polymeric couplers of the present invention include, but are not limited to, the following monomers:

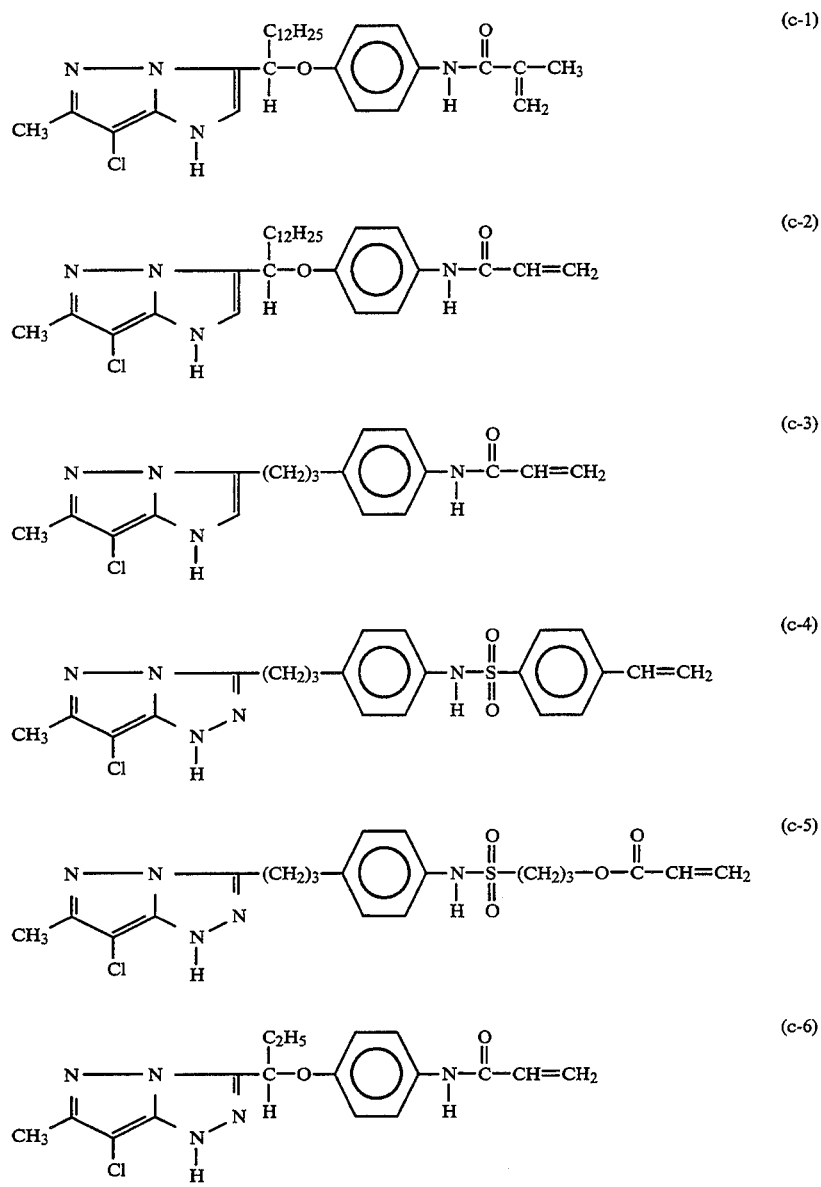

-continued
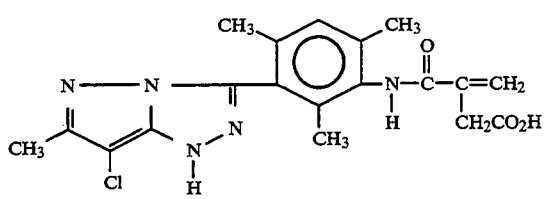
(c-7)
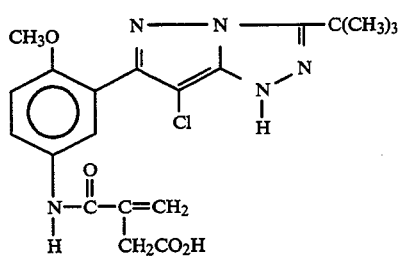
(c-8)
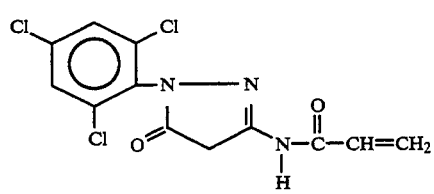
(c-9)
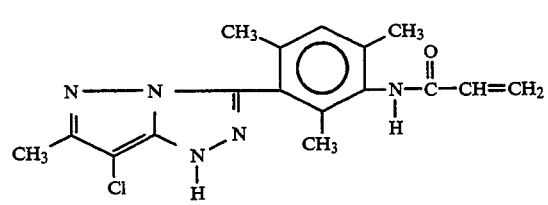
(c-10)
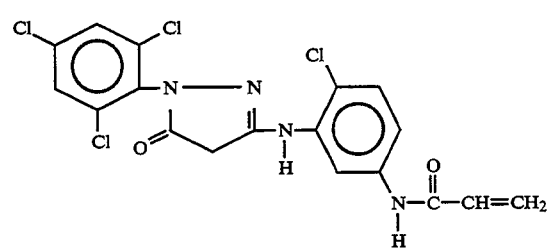
(c-11)
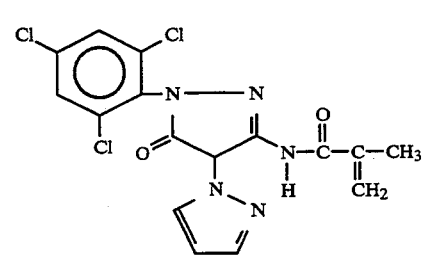
(c-12)
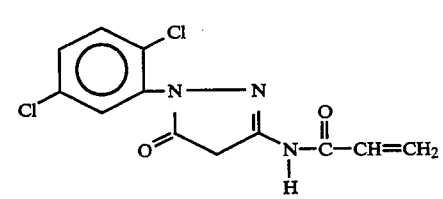
(c-13)

-continued
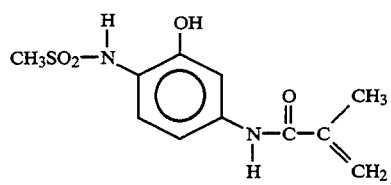
(c-14)
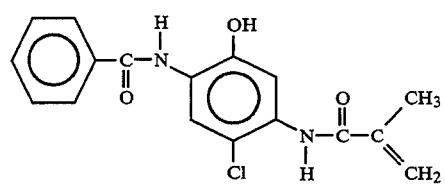
(c-15)
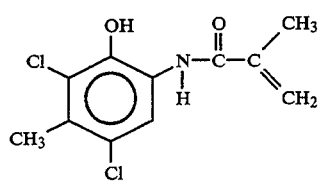
(c-16)
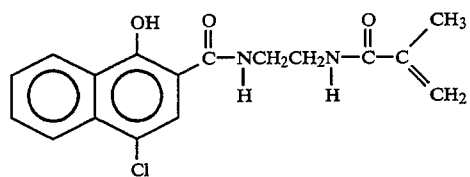
(c-17)
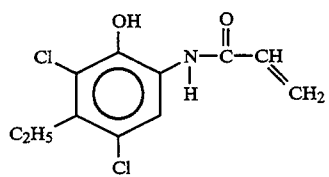
(c-18)
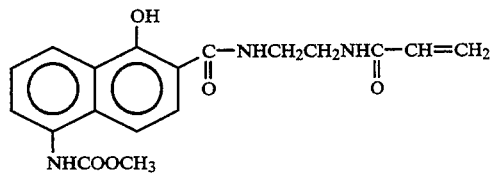
(c-19)
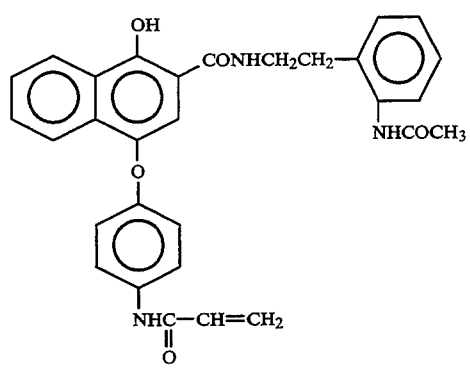
(c-20)

-continued
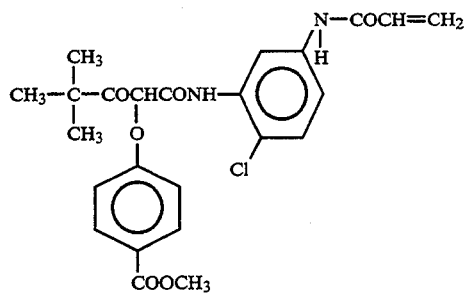 (c-21)
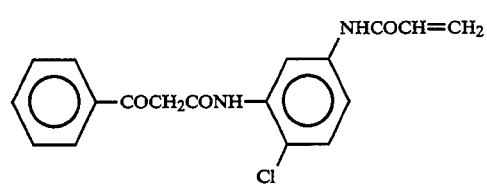 (c-22)
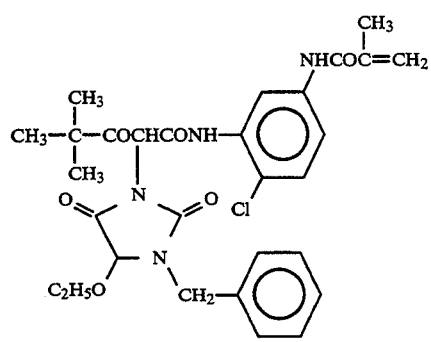 (c-23)
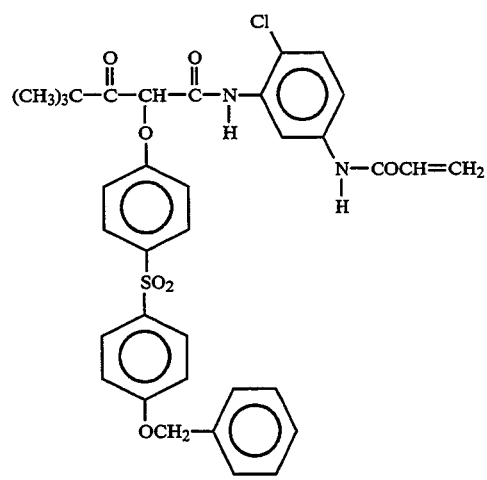 (c-24)
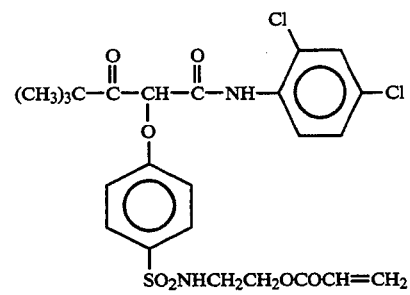 (c-25)

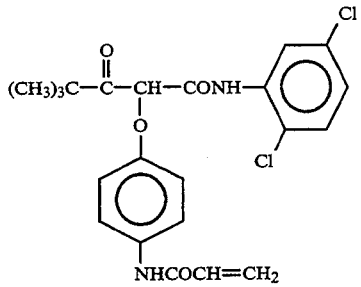
(c-26)

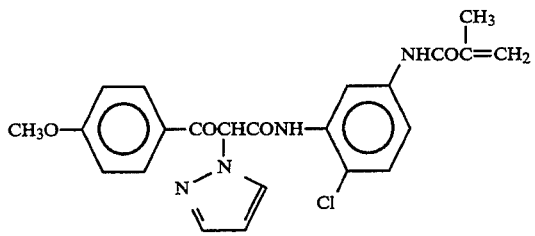
(c-27)

In the preparation of the water-dispersible polymeric couplers employed in the present invention at least one coupler monomer is mixed with at least one ionic monomer containing an ionizable functional group. The ionic monomer provides ionic charges which stabilize dispersions of the polymeric couplers. Preferably, the ionic monomer contains an ionizable functional group selected from the group consisting of sulfonates, sulfates and phosphates, with sulfonates and sulfates being particularly preferred. These ionic monomers are often referred to as surfactant monomers and are well known in the art. Suitable ionic monomers include, but are not limited to, the following:

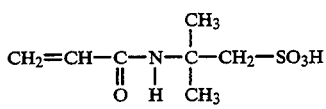 (i-1)

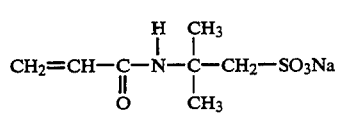 (i-2)

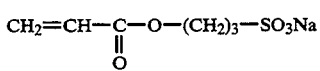 (i-3)

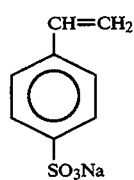 (i-4)

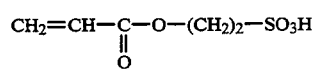 (i-5)

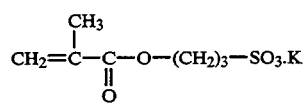 (i-6)

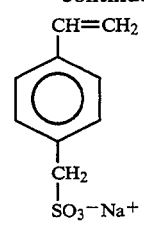 (i-7)

$CH_2=CH-SO_3Na$ (i-8)

The ionic monomer is included in the polymerization mixture in an amount sufficient to provide the polymeric coupler with less than 10 weight percent of the ionic monomer, and, preferably, with from 1 to 5 weight percent of the ionic monomer.

The mixture from which the polymeric coupler is polymerized may further include at least one additional non-dye-forming ethylenically unsaturated monomer. The non-dye-forming ethylenically unsaturated monomers may comprise diluent monomers and/or modifier monomers which modify one or more physical properties of the polymeric couplers such as the glass transition temperature, the hydrophobic-hydrophilic properties, and the like. The non-dye-forming ethylenically unsaturated monomer may be selected so as to provide useful physical and chemical properties for the polymeric coupler, including useful solubility, compatibility with other components of the photographic material, stability and flexibility. Many non-dye-forming ethylenically unsaturated monomers for use in polymeric couplers are known in the art and may be employed in the couplers of the present invention, including, for example, acrylic acid, methacrylic acid, acrylic acid esters, methacrylic acid esters, acrylic acid amides, methacrylic acid amides, acrylonitrile, methacrylonitrile, vinyl esters, e.g., vinyl acetate and vinyl butyrate, vinyl halides, e.g., vinyl chloride, vinyl bromide, vinylidine chloride, itaconic acid, itaconic acid monoesters, citraconic acid, crotonic acid, maleic acid esters, N-vinyl-2-pyrrolidone, N-vinyl pyridine, mixtures thereof and the like. In a preferred embodiment, the non-dye-forming ethylenically unsaturated monomer comprises one or more monomers selected from acrylic acid esters, methacrylic acid esters, acrylic acid amides and methacrylic acid amides, used in combination with the coupler monomer and the ionic monomer. In a further preferred embodiment, the non-dye-forming ethylenically unsaturated monomer comprises an alkoxy acrylate monomer as disclosed in the Lau et al U.S. Pat. No. 4,612,278, incorporated herein by reference.

Specific non-dye-forming ethylenically unsaturated monomers for use in forming the polymeric couplers of the present invention include, but are not limited to, the following:

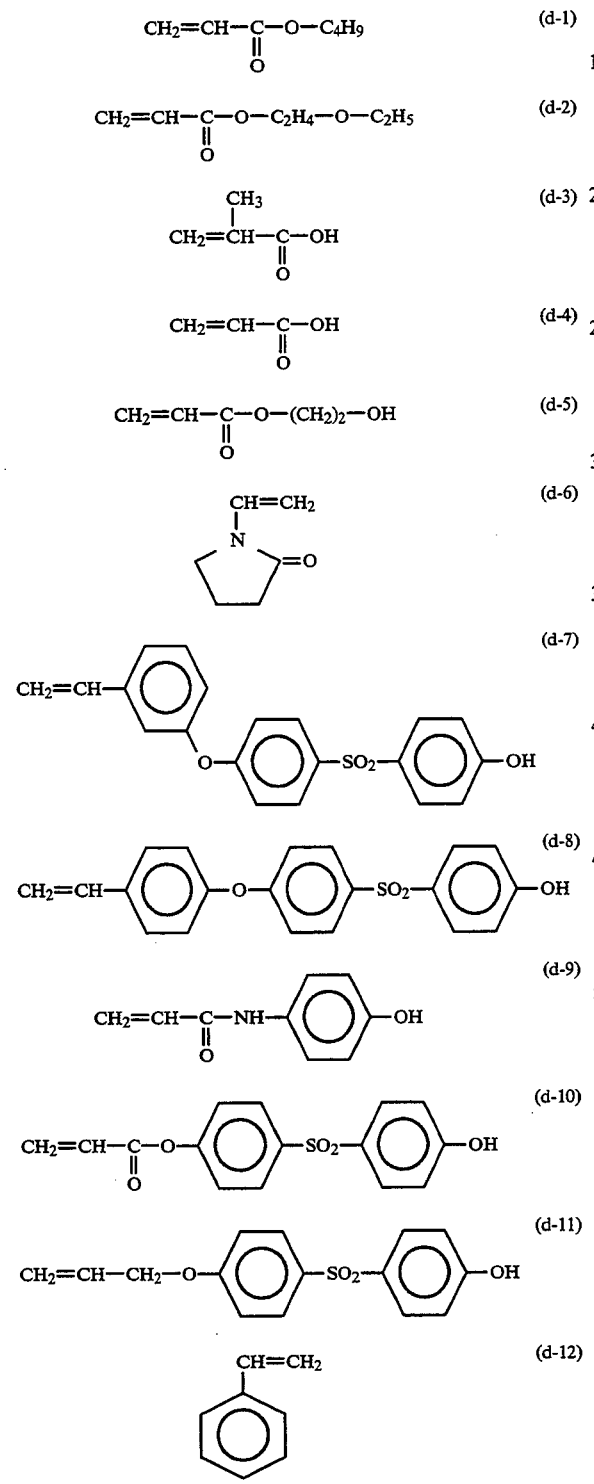

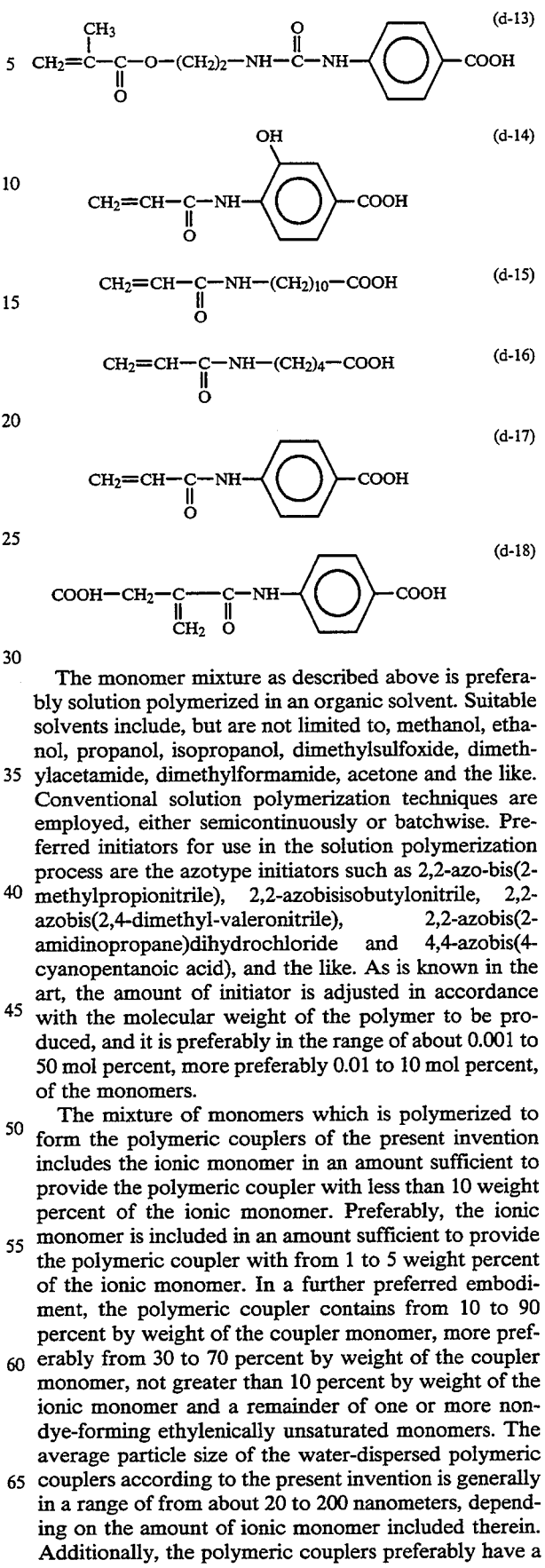

The monomer mixture as described above is preferably solution polymerized in an organic solvent. Suitable solvents include, but are not limited to, methanol, ethanol, propanol, isopropanol, dimethylsulfoxide, dimethylacetamide, dimethylformamide, acetone and the like. Conventional solution polymerization techniques are employed, either semicontinuously or batchwise. Preferred initiators for use in the solution polymerization process are the azotype initiators such as 2,2-azo-bis(2-methylpropionitrile), 2,2-azobisisobutylonitrile, 2,2-azobis(2,4-dimethyl-valeronitrile), 2,2-azobis(2-amidinopropane)dihydrochloride and 4,4-azobis(4-cyanopentanoic acid), and the like. As is known in the art, the amount of initiator is adjusted in accordance with the molecular weight of the polymer to be produced, and it is preferably in the range of about 0.001 to 50 mol percent, more preferably 0.01 to 10 mol percent, of the monomers.

The mixture of monomers which is polymerized to form the polymeric couplers of the present invention includes the ionic monomer in an amount sufficient to provide the polymeric coupler with less than 10 weight percent of the ionic monomer. Preferably, the ionic monomer is included in an amount sufficient to provide the polymeric coupler with from 1 to 5 weight percent of the ionic monomer. In a further preferred embodiment, the polymeric coupler contains from 10 to 90 percent by weight of the coupler monomer, more preferably from 30 to 70 percent by weight of the coupler monomer, not greater than 10 percent by weight of the ionic monomer and a remainder of one or more non-dye-forming ethylenically unsaturated monomers. The average particle size of the water-dispersed polymeric couplers according to the present invention is generally in a range of from about 20 to 200 nanometers, depending on the amount of ionic monomer included therein. Additionally, the polymeric couplers preferably have a weight average molecular weight of from 2000 to about 40,000.

As noted above, the polymeric couplers of the invention are preferably formed by solution polymerization. These polymeric couplers formed by solution polymerization tend to be non-spherical in shape and to have lower molecular weights.

The polymeric coupler is incorporated into the color photographic materials in the form of a water dispersion. The water-dispersed polymeric coupler may be formed according to several methods. That is, the polymer product resulting from the solution polymerization may optionally be diluted with the water-miscible organic solvent and then directly dispersed into water. Alternatively, water may be added to an organic solvent diluted solution product as prepared above to produce a stable polymer dispersion in water by phase inversion. The polymer product resulting from the solution polymerization may also be isolated as a solid and then later added to a water-miscible organic solvent and redispersed in water as described above. Thus, the polymeric coupler of the present invention is advantageous in that it may be isolated as a solid, for example, to facilitate storage and shipping, and then easily dispersed in water at a later time. Preferably, the water which is added to the polymer product or to which the polymer product is added has a volume of 0.5 to 20 times, and more preferably at least equal to, that of the diluted polymer product or optionally-diluted polymer product. To facilitate dispersion, the water may be heated, for example, to a temperature of from 20° to 100° C. Additionally, when the polymer product is diluted with an organic solvent as described above, it is preferred that the polymer product is diluted to a concentration of not greater than about 20 weight percent, and more preferably 10 weight percent, polymer product.

The color photographic materials of the present invention include the support, the silver halide emulsion and the water-dispersible polymeric coupler in a manner which is conventional in the color photographic art. While the silver halide emulsion and the polymeric coupler may be used in any concentration which is effective for the intended purpose, generally good results are obtained using concentrations ranging from about $10^{-4}$ to 0.5 mole of polymeric coupler per mole of silver in the silver halide emulsion.

The photographic materials according to the present invention may be simple elements or multilayer, multicolor elements. Additionally, the silver halide emulsion employed in the photographic materials may be of a variety of types known in the art, such as fine or course grain emulsions, tabular grain emulsions, silver chlorobromide, silver chloride, silver bromide and silver bromoiodide emulsions. Useful tabular grain emulsions are described in *Research Disclosure*, Item 22534, January 1983 and U.S. Pat. No. 4,748,106, incorporated herein by reference. The layers in which the polymer couplers of the invention are incorporated may also contain other coupler components, such as colored masking couplers, image-modifying couplers (DIR's or DIAR's as disclosed in U.S. Pat. Nos. 3,148,062, 3,227,554, 3,733,201, 4,409,323 and 4,248,962) and bleach accelerator-releasing couplers (BARC's as disclosed in EP 193,389).

The photographic materials according to the invention may further include conventional additives, including certain light stabilizers such as phenols, alkoxybenzene derivatives, anilines, oxyanilines and the like, if desired.

The color photographic materials of the invention may be imagewise exposed in a manner well known in the color photography art, followed by development with an aromatic primary amine developer. As is further well known in the art, the oxidation product of the aromatic primary amine developer reacts with the polymeric coupler to form the colored dye image.

The color photographic materials, polymeric couplers and methods according to the present invention are demonstrated by the following examples wherein parts and percentages are by weight unless otherwise specified.

EXAMPLE 1

This example demonstrates the preparation of a water-dispersed polymeric coupler using a semicontinuous solution polymerization method. With reference to the specific coupler monomers, ionic monomers and non-dye-forming monomers set forth above, 6.5 g of (c-1), 0.5 g of (d-1), 2.5 g of (d-3), 0.5 g of (i-1) and 0.25 g of 2,2'-azo-bis(2-methyl-propionitrile) (AIBN) were dissolved in 100 ml of an ethanol/tetrahydrofuran (9/1 v/v) mixture. A 250 ml 3-neck flask equipped with a condenser, magnetic stirrer and nitrogen inlet was evacuated with an aspirator and filled with nitrogen several times. The flask was immersed in a silicon oil bath at 90° C. The monomer solution was then pumped in over five hours using a fluid metering pump. Afterward, 0.25 g of AIBN in 5 ml of ethanol was added to remove residual monomers.

The resulting polymer solution was then divided into two parts, a first part comprising one third of the solution and a second part comprising the remaining two thirds of the solution. The first part was transferred to a separatory funnel while it was diluted and then added slowly to 100 ml of hot distilled water with vigorous stirring and then dialyzed. The second part was poured into 200 ml of cold distilled water with stirring. The resulting precipitate was isolated with filtration and dried in a vacuum oven. The dry polymer was then redissolved in 70 ml acetone, dispersed in 200 ml of vigorously stirred hot water, and dialyzed.

The combustion analysis results (theoretical values in parenthesis) and particle diameter measurements from the products are as follows:

| Sample | Combustion Analysis | Particle Diameter |
|---|---|---|
| A (First Part) (directly dispersed) | Cl-4.49% (4.48%) N-8.95% (9.20%) | 122 nm |
| B (Second Part) (isolated) | Cl-4.27% (4.48%) N-8.90% (9.20%) | 82 nm |

EXAMPLE 2

This example demonstrates the preparation of a polymeric coupler using a batch solution polymerization method. 6.5 g of (c-1), 0.5 g of (d-1), 2.5 g of (d-3), 0.5 g of (i-1) and 100 ml of ethanol were mixed in a 250 ml 3-neck flask equipped with a condenser, a nitrogen inlet and a magnetic stirrer. The solution was immersed in an oil bath and heated to 85° C. until all the monomers were dissolved. 0.25 g of AIBN in 5 ml ethanol was added to the flask. Polymerization was continued for five hours and 0.25 g of AIBN in 5 ml of ethanol was postadded.

The resulting polymer solution was divided into two parts as in Example 1. The first part was directly dispersed into 150. ml of hot distilled water with vigorous stirring. The second part was precipitated from water and isolated in a manner similar to that described in Example 1. The precipitated polymer was redissolved in 50 ml of acetone and dispersed in 150 ml of hot distilled water.

The combustion analysis results (theoretical values in parenthesis) and particle diameter measurements from the products are as follows:

| Sample | Combustion | Particle Size |
|---|---|---|
| C (First Part) (directly dispersed) | Cl-4.50% (4.48%) N-8.86% (9.20%) | 93 nm |
| D (Second Part) (isolated) | Cl-4.27% (4.48%) N-8.90% (9.20%) | 95 nm |

EXAMPLE 3

The polymeric couplers produced in Examples 1 and 2 were incorporated into color photographic materials of the following composition, coated on a cellulose acetate film support. For purposes of determining the amount of coupler, the molecular weight of the polymeric coupler was taken to be the average weight per coupling moiety.

| 1st Layer: | |
|---|---|
| Gelatin | 3.77 g/m² |
| AgBrI emulsion | 0.91 g/m² |
| Polymeric coupler | 0.00161 mmol/m² (1.61 × 10⁻⁶ mol/m²) |
| Alkanol-XC* | 0.38 g/m 2 |
| 2nd Layer: | |
| Gelatin | 2.69 g/m² |
| Bis(vinylsulfonylmethyl ether) | .00125 g/m² |
| Alkanol-XC* | 0.27 g/² |

\* Trademark of E. I. DuPont Company

For comparative purposes, similar color photographic materials employing non-polymeric couplers CE-1 and CE-2 of the formulae set forth below were also prepared. In these comparison materials, equal moles of the couplers were dispersed by conventional means in half their weight of the coupler solvent, i.e., tritolyl phosphate (mixed isomers).

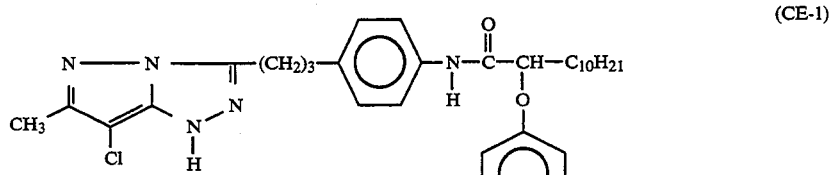
(CE-1)

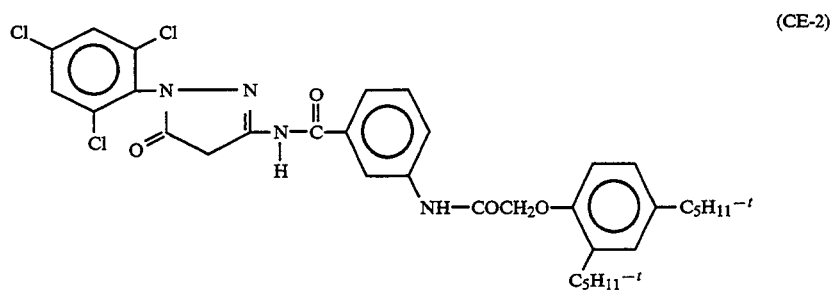
(CE-2)

The coatings were exposed to a step wedge and processed as follows (all steps carried out at 40° C.):

| Color Developer | 2.5 minutes |
|---|---|
| Bleach | 4.0 minutes |
| Wash | 3.0 minutes |
| Fixer | 4.0 minutes |
| Wash | 4.0 minutes |

The formulations of the process solutions were as follows:

| Color Developer: | |
|---|---|
| Water | 800.0 mL |
| Potassium carbonate, anhydrous | 34.30 g |
| Potassium bicarbonate | 2.32 g |
| Sodium sulfite, anhydrous | 0.38 g |
| Sodium metabisulfite | 2.78 g |
| Potassium iodide | 1.20 mg |
| Sodium bromide | 1.31 g |
| Diethylenetriaminepentaacetic acid pentasodium salt (40% solution) | 8.43 g |
| Hydroxylamine sulfate | 2.41 g |
| 2-Amino-4-[N-ethyl-N-(2-hydroxyethyl)-amino]toluene sulfate | 4.52 g |
| Water to make | 1.00 L |
| pH @ 80° F.: 10.00 +/− 0.05 | |
| Bleach: | |
| Water | 600.0 mL |
| Ammonium bromide | 50.00 g |
| 1,3-Propanediaminetetraacetic | 30.27 g |

-continued

| | |
|---|---|
| acid | |
| Ammonium hydroxide (28% ammonia) | 35.20 g |
| Ferric nitrate nonahydrate | 36.40 g |
| Glacial acetic acid | 26.50 g |
| 1,3-Diamino-2-propanoltetraacetic acid | 1.00 g |
| Ammonium ferric EDTA (1.56M, pH 7.05, 44% wt.) (contains 10% molar excess EDTA, 3.5% wt.) | 149.00 g |
| Water to make | 1.00 L |
| pH @ 80° F.: 5.25 +/− 0.10 | |
| Adjust pH with NH4OH or HNO3 | |
| Fixer: | |
| Water | 500.0 mL |
| Ammonium thiosulfate (56.5% ammonium thiosulfate, 4% ammonium sulfite) | 162.00 mL |
| Sodium metabisulfite | 11.85 g |
| Sodium hydroxide (50% solution) | 2.00 mL |
| Water to make | 1.00 L |
| pH at 80° F.: 6.50 +/− 0.05 | |
| Adjust pH with NaOH or glacial acetic acid | |

The maximum Status M densities (D-max) of the sample are set forth in Table 1:

TABLE I

| Sample | | D-max |
|---|---|---|
| A | (This invention) | 3.00 |
| B | (This invention) | 3.03 |
| C | (This invention) | 2.78 |
| D | (This invention) | 2.90 |
| CE1 | (Control) | 2.67 |
| CE2 | (Control) | 1.67 |

Table I shows that polymeric couplers prepared by this method produce very high dye densities (D-max).

EXAMPLE 4

Additional polymeric couplers were prepared in a water-miscible organic solvent, diluted to less than 10 weight percent solids and dispersed directly in hot water with vigorous stirring. The average particle size of the polymeric couplers in the resulting aqueous polymer dispersions was determined using Malvern's submicron particle size distribution analyzer (Autosizer IIC). The monomers and weight percentages thereof used to produce the polymers, the average particle size and the mode of preparation of the polymer (B=batch, S=semicontinuous) are set forth in Table II.

TABLE II

| Sample | Coupler Monomer (wt. %) | Non-dye forming Monomers (wt. %) | Ionic Monomer (wt. %) | Average Particle size (nm) | Mode (B = batch) (S = semicont) |
|---|---|---|---|---|---|
| 1 | C-3(38.6) | d-2(48.6);d-4(0.1) | i-1(4.7) | 176 | S |
| 2 | C-3(36.8) | d-2(46.3);d-5(12.4) | i-1(4.5) | 154 | S |
| 3 | C-3(35.1) | d-2(44.1);d-8(16.6) | i-1(4.2) | 102 | S |
| 4 | C-3(35.2) | d-2(29.5);d-9(31.1) | i-1(4.2) | 134 | S |
| 5 | C-11(67.6) | d-2(28.7) | i-1(3.7) | 108 | S |
| 6 | C-4(49.0) | d-2(46.5) | i-1(4.5) | 148 | S |
| 7 | C-5(49.6) | d-2(46.0) | i-1(4.4) | 126 | S |
| 8 | C-9(56.8) | d-1(21.9);d-11(17.8) | i-1(3.5) | 129 | S |
| 9 | C-10(38.5) | d-2(48.4);d-4(8.1) | i-2(5.1) | 170 | S |
| 10 | C-3(42.0) | d-2(52.9) | i-1(5.1) | 76 | B |
| 11 | C-3(41.8) | d-2(52.6) | i-3(5.6) | 39 | B |
| 12 | C-3(42.1) | d-2(52.9) | i-4(5.0) | 144 | B |
| 13 | C-3(42.1) | d-2(53.1) | i-5(4.8) | 54 | B |
| 14 | C-3(42.1) | d-2(52.9) | i-4(5.0) | 85 | S |
| 15 | C-3(42.1) | d-2(53.1) | i-5(4.8) | 86 | S |
| 16 | C-12(46.3) | d-2(48.5) | i-2(5.2) | 74 | S |
| 17 | C-8(49.3) | d-2(49.4) | i-2(1.31) | 154 | S |
| 18 | C-6(37.9) | d-1(27.0);d-12(30.8) | i-1(4.4) | 40 | S |
| 19 | C-6(39.4) | d-1(28.1);d-14(28.0) | i-1(4.5) | 66 | S |
| 20 | C-6(43.4) | d-1(30.9);d-15(20.7) | i-1(5) | 30 | S |
| 21 | C-6(41.6) | d-1(29.6);d-13(24.0) | i-1(4.8) | 38 | S |
| 22 | C-6(42.2) | d-1(30.2);d-16(22.5) | i-1(4.9) | 49 | S |
| 23 | C-6(39.7) | d-1(28.3);d-17(27.5) | i-1(4.6) | 48 | S |
| 24 | C-6(40) | d-1(15);d-14(40) | i-1(5) | 48 | S |
| 25 | C-2(60) | d-1(15);d-3(20) | i-1(5) | 156 | S |
| 26 | C-2(65) | d-1(10);d-3(20) | i-1(5) | 85 | S |
| 27 | C-1(70) | d-3(25) | i-1(5) | 62 | B |
| 28 | C-7(40) | d-1(58) | i-1(2) | 124 | B |
| 29 | C-1(60) | d-1(10);d-3(25) | i-1(5) | 76 | S |
| 30 | C-1(65) | d-1(5);d-3(25) | i-1(5) | 40 | S |
| 31 | C-6(40) | d-1(42.5);d-3(15) | i-1(2.5) | 125 | S |
| 32 | C-6(40) | d-1(44);d-3(15) | i-1(1) | 149 | S |
| 33 | C-1(65) | d-1(5);d-3(25) | i-1(5) | 57 | B |
| 34 | C-1(70) | d-3(25) | i-1(5) | 92 | S |
| 35 | C-1(65) | d-1(9);d-3(25) | i-1(1) | 148 | B |
| 36 | C-1(65) | d-1(8);d-3(25) | i-1(2) | 130 | B |
| 37 | C-1(65) | d-1(7);d-3(25) | i-1(3) | 89 | B |

EXAMPLE 5

This example demonstrates the preparation of a polymeric coupler dispersion in water by adding water to the diluted polymer solution in a water-miscible solvent. The polymeric coupler was prepared first by batch solution polymerization. Specifically, 7.0 g of (c-1), 2.5 g of (d-3), 0.5 g of (i-1) and 30 ml of methanol were mixed in a 100 ml 3-neck flask equipped with a condenser, a nitrogen inlet and magnetic stirrer. The solution was immersed in an oil bath and heated to 70° C. until all the monomers were dissolved. 0.25 g of AIBN in 1 ml methanol was added to the flask. Polymerization was continued for twenty hours.

The resulting polymer solution (30% solids) was divided into six portions and diluted with methanol to different percent solids as set forth in Table III. Cold distilled water was then added to the vigorously stirred polymer solutions. The clear polymer solution became cloudier when water was added. When enough water was added, a stable polymer dispersion was formed due to the phase inversion. These dispersions were dialyzed against distilled water for three days. Their particle sizes measured by Malvern's Autosizer IIC are also listed in Table III.

TABLE III

| % Solid | Result | Particle Size (nm) |
|---------|--------|-------------------|
| 15 | polymer precipitated | — |
| 12.5 | polymer precipitated | — |
| 10 | good dispersion | 180 |
| 7.5 | good dispersion | 71 |
| 5 | good dispersion | 31 |
| 2.5 | good dispersion | 21 |

The preceding examples are set forth to illustrate specific embodiments of the invention and are not intended to limit the scope of the materials and methods of the present invention. Additional embodiments and advantages within the scope of the claimed invention will be apparent to one of ordinary skill in the art.

What is claimed is:

1. A color photographic material, comprising a support bearing a silver halide emulsion and at least one polymeric coupler, the polymeric coupler being non-spherical in shape, being directly water dispersed in the color photographic material and being prepared by solution polymerization of a mixture of at least one ethylenically unsaturated coupler monomer containing a dye-forming coupler moiety and at least one ionic monomer containing an ionizable functional group selected from the group consisting of sulfonate, sulfate and phosphate groups, in a water-miscible organic solvent, the polymeric coupler containing less than 10 weight percent of the ionic monomer.

2. A color photographic material as defined by claim 1, wherein the coupler moiety is a magenta dyeforming coupler moiety.

3. A color photographic material as defined by claim 2, wherein the coupler moiety comprises a pyrazolotriazole group.

4. A color photographic material as defined by claim 1, wherein the coupler moiety is a cyan dyeforming coupler moiety.

5. A color photographic material as defined by claim 1, wherein the coupler moiety is a yellow dyeforming coupler moiety.

6. A color photographic material as defined by claim 1, wherein the ionic monomer contains an ionizable functional group selected from the group consisting of sulfonates and sulfates.

7. A color photographic material as defined by claim 1, wherein the mixture from which the polymeric coupler is polymerized further includes at least one non-dye-forming ethylenically unsaturated monomer.

8. A color photographic material as defined by claim 7, wherein the non-dye-forming ethylenically unsaturated monomer is selected from the group consisting of acrylic acid, methacrylic acid, acrylic acid esters, methacrylic acid esters, acrylic acid amides, methacrylic acid amides, acrylonitrile, methacrylonitrile, vinyl chloride, itaconic acid, itaconic acid monoesters, citraconic acid, crotonic acid, maleic acid esters, N-vinyl-2-pyrrolidone, N-vinyl pyridine, and mixtures thereof.

9. A color photographic material as defined by claim 8, wherein the non-dye-forming ethylenically unsaturated monomer is selected from the group consisting of acrylic acid esters, methacrylic acid esters, acrylic acid amides and methacrylic acid amides.

10. A color photographic material as defined by claim 7, wherein the non-dye-forming ethylenically unsaturated monomer modifies the glass transition temperature or the hydrophilic-hydrophobic properties of the polymeric coupler.

11. A color photographic material as defined by claim 1, wherein the polymeric coupler contains from 1 to 5 weight percent of the ionic monomer.

12. A color photographic material as defined by claim 1, wherein the polymeric coupler has a weight average molecular weight of from 2000 to about 40,000.

13. A color photographic material as defined by claim 1, wherein the polymeric coupler has an average particle size of from about 20 to 200 nanometers.

* * * * *